(12) United States Patent
Brickett

(10) Patent No.: US 6,928,765 B2
(45) Date of Patent: Aug. 16, 2005

(54) TENSION ACTIVATED, HYDRAULICALLY CONTROLLED ROPE SEVERING DEVICE

(75) Inventor: Ben Brickett, Eliot, ME (US)

(73) Assignee: Blue Water Concepts, Inc., Eliot, ME (US)

( * ) Notice: Subject to any disclaimer, the term of this patent is extended or adjusted under 35 U.S.C. 154(b) by 0 days.

(21) Appl. No.: 10/429,567

(22) Filed: May 5, 2003

(65) Prior Publication Data

US 2003/0204984 A1 Nov. 6, 2003

Related U.S. Application Data

(60) Provisional application No. 60/377,635, filed on May 3, 2002.

(51) Int. Cl.[7] .............................................. A01K 97/00
(52) U.S. Cl. .................................................... 43/1; 43/4
(58) Field of Search ............................ 43/4, 17.2, 44.9, 43/1; 30/272.1, 208, 241; 83/950, 639.4; 114/221 A

(56) References Cited

U.S. PATENT DOCUMENTS

| | | | | |
|---|---|---|---|---|
| 2,711,583 A | * | 6/1955 | Raby ............................. 30/228 |
| 2,968,112 A | * | 1/1961 | McClure ....................... 43/17.2 |
| 3,122,046 A | * | 2/1964 | Baker et al. ................... 83/600 |
| 3,186,121 A | * | 6/1965 | Jones ........................... 43/17.2 |
| 3,523,477 A | * | 8/1970 | Miller ........................ 83/639.4 |
| 3,763,738 A | * | 10/1973 | Temple ........................ 89/1.14 |
| 3,802,110 A | * | 4/1974 | Guillemain ................... 43/17.2 |
| 3,848,334 A | * | 11/1974 | Mattera ......................... 30/180 |
| 3,886,842 A | * | 6/1975 | Giebel et al. ................ 89/1.14 |
| 4,026,028 A | * | 5/1977 | Green .......................... 30/233 |
| 4,052,922 A | * | 10/1977 | Bub ........................... 83/639.4 |
| 4,057,897 A | * | 11/1977 | Seymour ..................... 30/272.1 |
| 4,463,496 A | * | 8/1984 | Reich et al. ................... 30/180 |
| 4,742,605 A | * | 5/1988 | Ritacco ....................... 24/602 |
| 5,412,897 A | * | 5/1995 | Smith .............................. 43/4 |
| 5,857,881 A | * | 1/1999 | Zippel, Sr. ...................... 441/6 |
| 5,913,670 A | * | 6/1999 | Anderson et al. ............. 43/4.5 |
| 6,038,807 A | * | 3/2000 | Taylor ......................... 43/17.2 |
| 6,357,162 B1 | * | 3/2002 | Torngren ......................... 43/4 |
| 6,564,500 B1 | * | 5/2003 | Ames ........................ 43/43.12 |

FOREIGN PATENT DOCUMENTS

| EP | 344531 A2 | * | 12/1989 | ........... B26F/13/00 |
|---|---|---|---|---|
| JP | 11332443 A | * | 12/1999 | ........... A01K/97/24 |

* cited by examiner

Primary Examiner—Kurt Rowan
(74) Attorney, Agent, or Firm—Todd A. Sullivan, Esq.; Hayes Soloway P.C.

(57) ABSTRACT

A rope severing apparatus for releasing a rope after continued tension. The first element of the apparatus is the base, which has elastic properties that permit the base to stretch when realizing tensional forces. The base may be a spring in one embodiment, although those skilled in the art would recognize there are other available elements with similar elastic properties that alternatively may be used. The base is connected to a first connection point wherein the first connection point is formed to admit the rope. Preferably the first connection point is a hole through which the rope can be run and tied off. Finally, the present invention requires a cutting edge connected to the base and slidably oriented with the first connection point. The cutting edge is arranged so that it will slide toward the first connection point and sever the rope when the apparatus realizes a tensional force.

11 Claims, 6 Drawing Sheets

TENSION ACTIVATED, HYDRAULICALLY CONTROLLED ROPE SEVERING DEVICE

The present application claims the benefit of a provisional application Ser. No. 60/377,635 filed on May 3, 2002.

FIELD

The present invention is in the field of fishing apparatuses. Specifically, the present invention is in the field of fishing apparatuses used with unattended gear. More specifically, the present invention is in the field of marine wildlife preservation as it relates to the hazard of unattended fishing gear.

BACKGROUND OF THE PRESENT INVENTION

The northern right whale (Eubalanea glacialis) is the most critically endangered large whale in the world, and is protected under the Endangered Species Act. The western North Atlantic population is estimated to be approximately 300 animals. In 1995, the reauthorized Marine Mammal Protection Act (MMPA) mandated that the kill of northern right whales from interaction with commercial fishing gear be reduced to zero. In September 1996 a Federal District Court in Massachusetts issued an injunction which ordered the Massachusetts Division of Marine Fisheries (MDMF) to develop a proposal to restrict, modify, or eliminate the use of fixed fishing gear in waters of Massachusetts considered right whale critical habitat, including most of Cape Cod Bay. Some measures proposed to minimize the entanglement of right whales with fixed fishing gear include area/time closures and/or modification of the gear. Unfortunately, so little is known about the entanglement mechanism and behavior of the whales, that the protective measures under consideration could put fishermen out of business without solving the problem for the whales. It is imperative that we find solutions, which eliminate entanglement but don't keep fishermen from fishing their gear. Lines associated with lobster and gillnet gear are known to entangle whales. Vertical lines extending from the gear to the surface serve several purposes. They mark the gear's location and provide the means to haul the gear to the surface. Gear modifications at the surface currently include weak links which are located at buoys and designed to break away leaving a knotless end on the buoy line thus minimizing the potential of the line catching in the whales baleen. Many ideas have been proposed to solve the entanglement problem and there has been considerable discussion of the question by fishermen, biologists, and gear technologists.

One of the solutions devised to combat the problems caused by unattended fishing lines is a weak link or breakaway link. A breakaway link, as described in U.S. Pat. No. 5,913,670, is designed to be located on the unattended fishing line. When sufficient tension is received along the fishing line, such as the tension caused by an entangled whale, the breakaway link breaks and releases the fishing line, allowing the whale to disentangle. The breakaway link has two major problems.

The first problem is that the tension created by reeling the fishing line in is similar to the tension created by an entangled whale. To avoid breaking the breakaway link when reeling in the fishing line, fishermen must locate the link close enough to the surface to reach and begin reeling in the line below the breakaway link. Often whales get caught in the fishing line closer to the bottom of the ocean. If the fishing line breaks only near the surface, the whales can remain entangled or become injured while disentangling even though the rope is released. The continued problem is due to the distance between the whale and the released end of the rope. Ideally, a device should be constructed that will disengage the rope at the bottom of an unattended fishing line for entangled whales, but will not disengage when fishermen reel in the fishing line.

The second problem with the breakaway link is knotting. Typically, a breakaway link is some type of ring of metal. To make the link part of the unattended fishing line, a length of rope is tied from the buoy to the link and another length of rope is tied from the link to the submerged traps. The ropes are tied to the link by making knots in the ropes. When the links break, the knots remain. Knots in the rope impede disentanglement and can cause injury to the whales. Ideally, a device should be constructed that will disengage the rope knotlessly.

SUMMARY OF THE PRESENT INVENTION

The present invention is based on the realization that a tension activated, time controlled rope severing device connected to ropes used in conjunction with unattended fishing gear will protect whales and other marine wildlife from the hazard of becoming unintentionally caught and injured or killed while also protecting commercial fishermen from unnecessary loss of fishing gear or disruption of fishing activity.

The present invention is capable of being located anywhere along the fishing rope. If a whale or other marine wildlife becomes entangled in the fishing rope, the present invention will cause the rope to be severed before the whale suffers any significant injury. As a result, the marine wildlife is protected from unintended and unnecessary injury. Because the present invention can endure thousands of pounds of line tension before severing the rope for a variably significant period of time, the rope will not break under the tension provided by the weight secured to the rope while being reeled in by fishermen, but will break for an entangled sea creature. Finally, the rope is cut substantially near the knot used to attach the present invention causing the knot to slip loose and/or be removed and achieving knotless line release.

Therefore, an object of the present invention is to sever a fishing rope if a marine creature becomes significantly entangled in the fishing rope.

It is a further object of the present invention to avoid severing the fishing rope if a marine creature is only briefly entangled in the fishing rope and frees itself.

It is a further object of the present invention to be able to support the sinker weight at the bottom of a fishing rope without severing while the fishermen are reeling the fishing rope in.

It is a further object of the present invention to be tension insensitive, such that the invention is able to endure thousands of pounds of tension without severing the rope any faster than while enduring hundreds of pounds of tension.

It is a further object of the present invention to be capable of withstanding significant atmospheric pressures without affecting performance.

It is a further object of the present invention to render the rope knotless once the rope is severed thereby further protecting entangled wildlife.

BRIEF DESCRIPTION OF THE DRAWING

These and other features and advantages of the present invention will be better understood by reading the following detailed description, taken together with the drawings wherein.

DETAILED DESCRIPTION OF THE INVENTION

Figure 1:
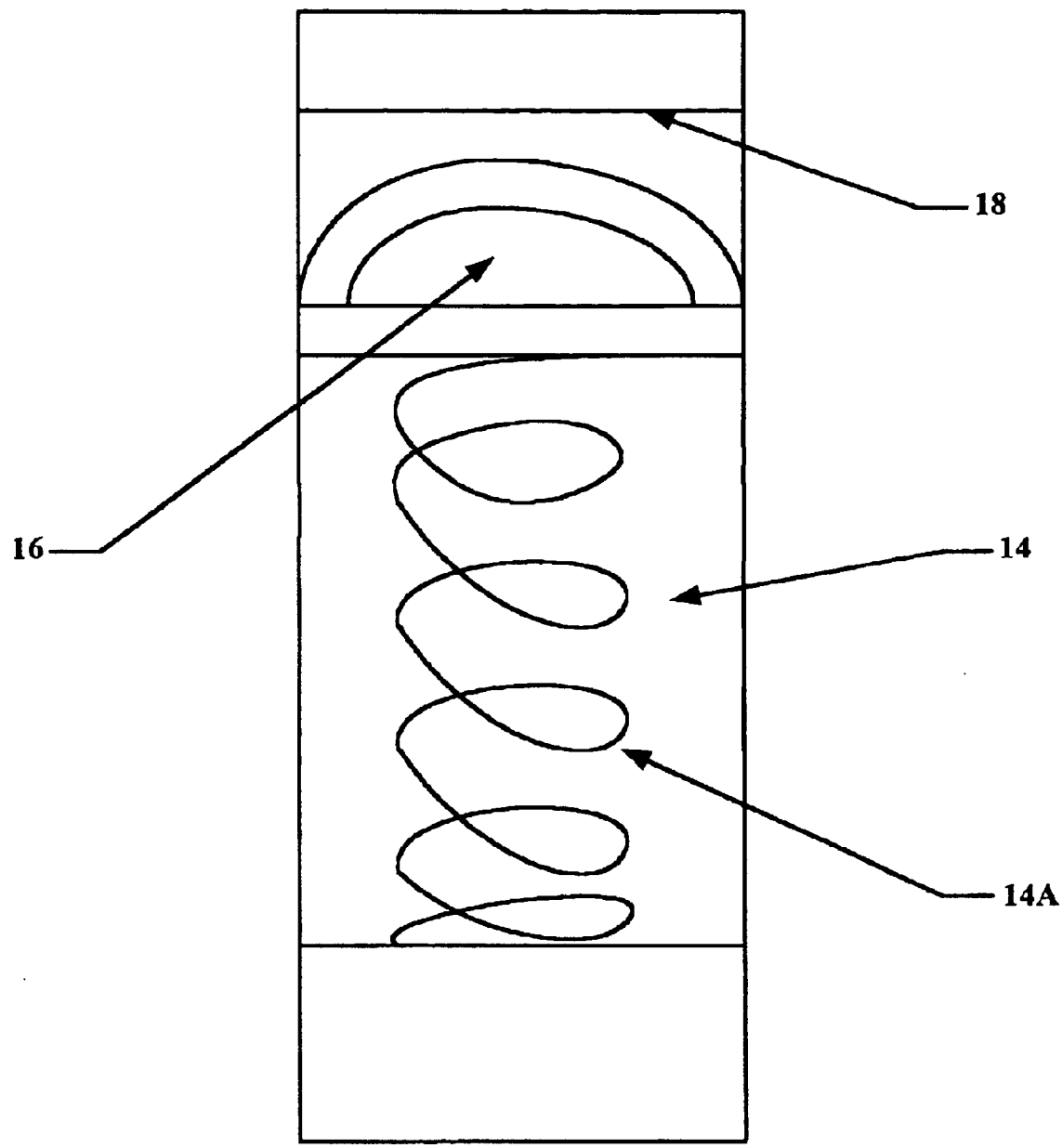
FIG. 1 shows a cross-sectional diagram of one embodiment of the present invention.
Figure 2:
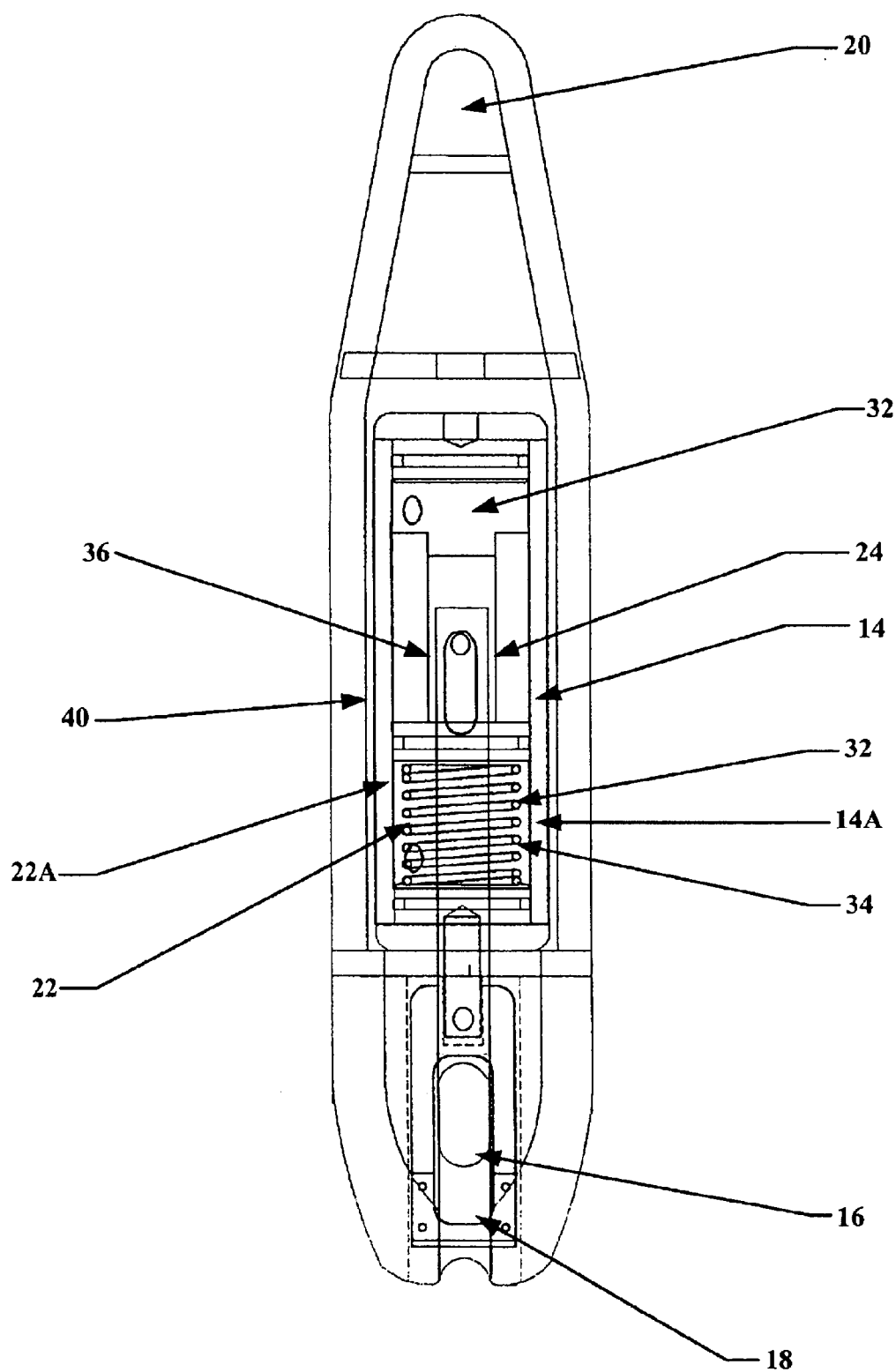
FIG. 2 shows a cross-sectional diagram of another embodiment of the present invention.
Figure 3:
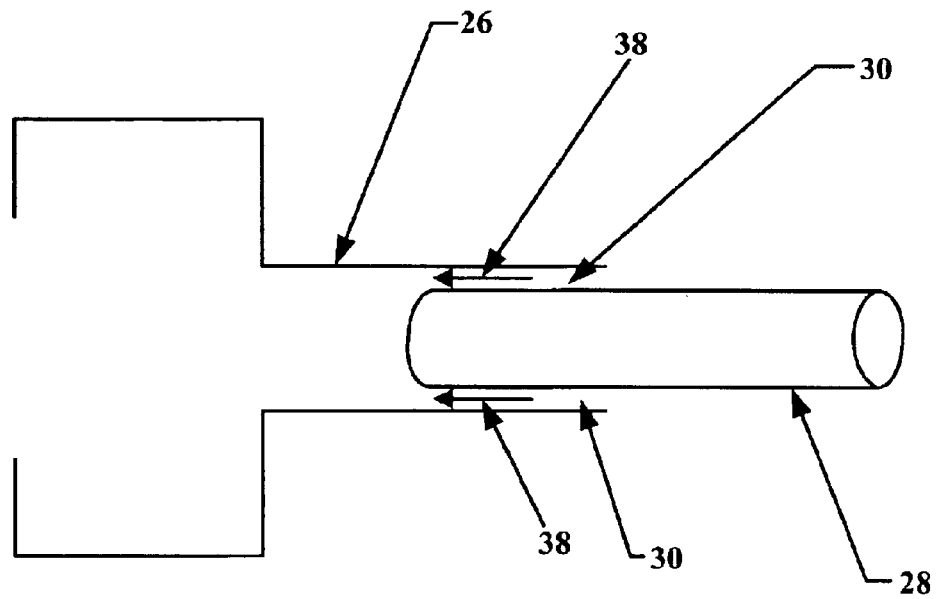
FIG. 3 shows a cross-sectional diagram of a regulator.
Figure 4:
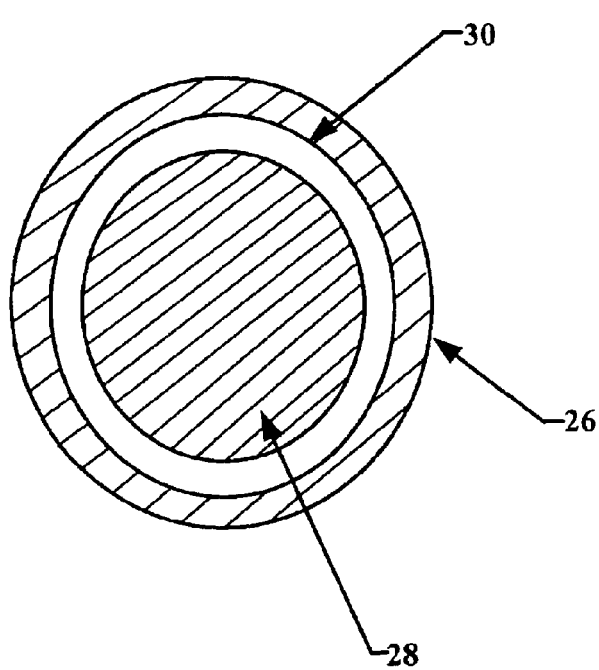
FIG. 4 shows another cross-sectional diagram of the regulator that is shown in FIG. 3.
Figure 5:
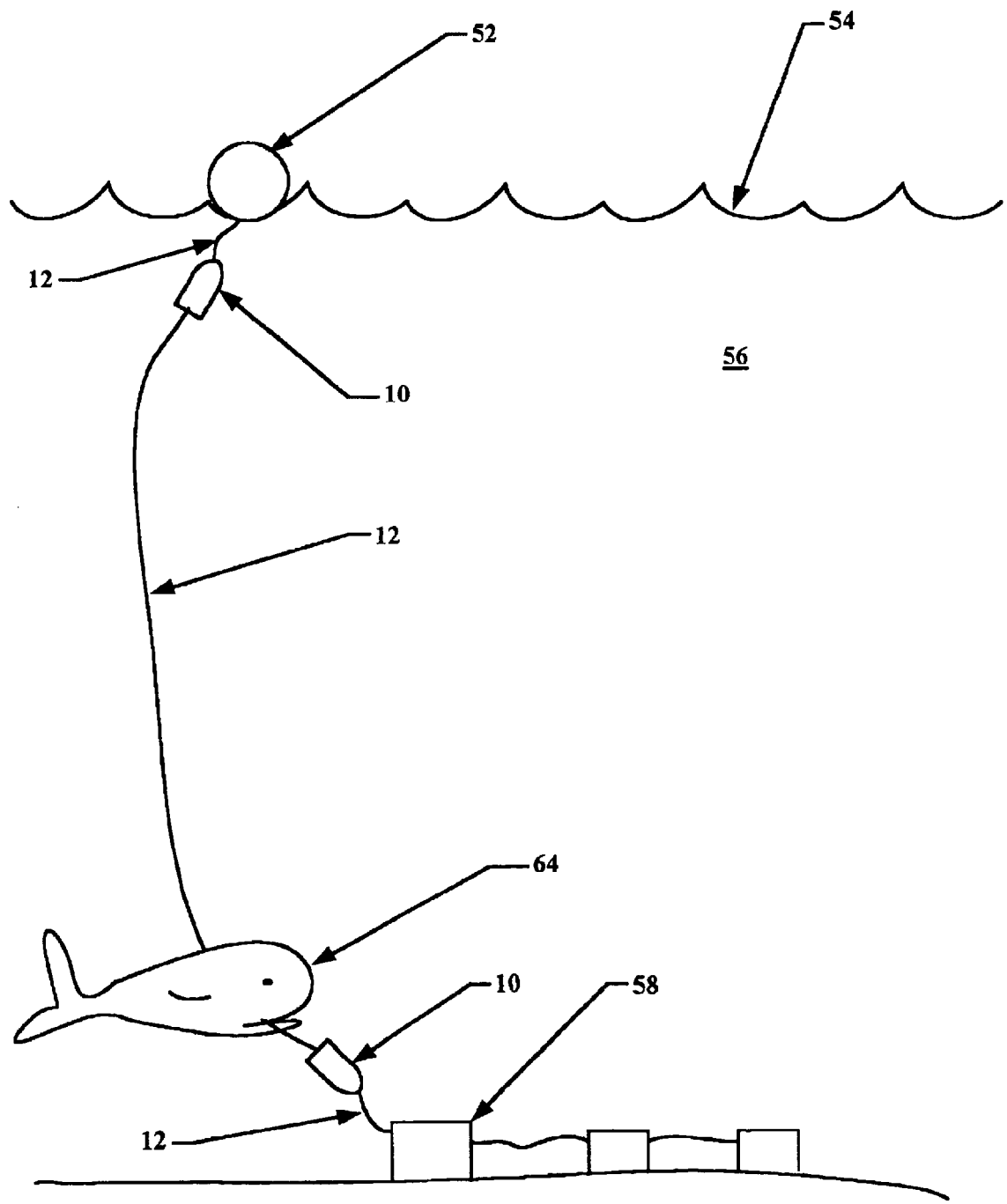
FIG. 5 is a diagram of the present invention in its intended environment.
Figure 6:
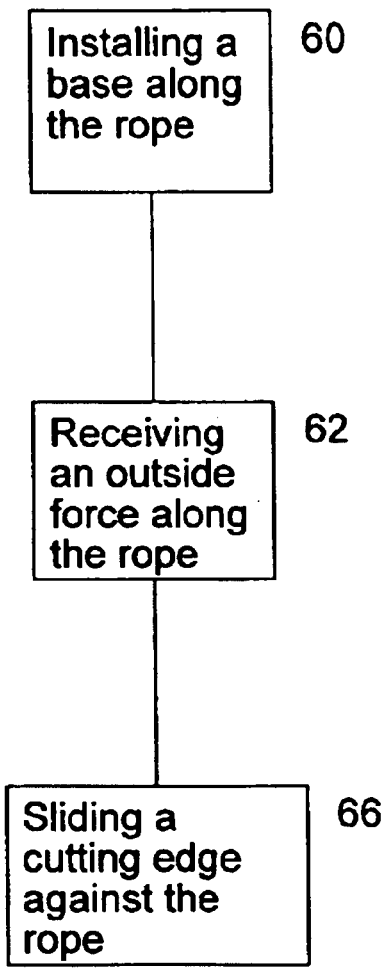
FIG. 6 is a flow diagram of one embodiment of the present invention.
Figure 7:
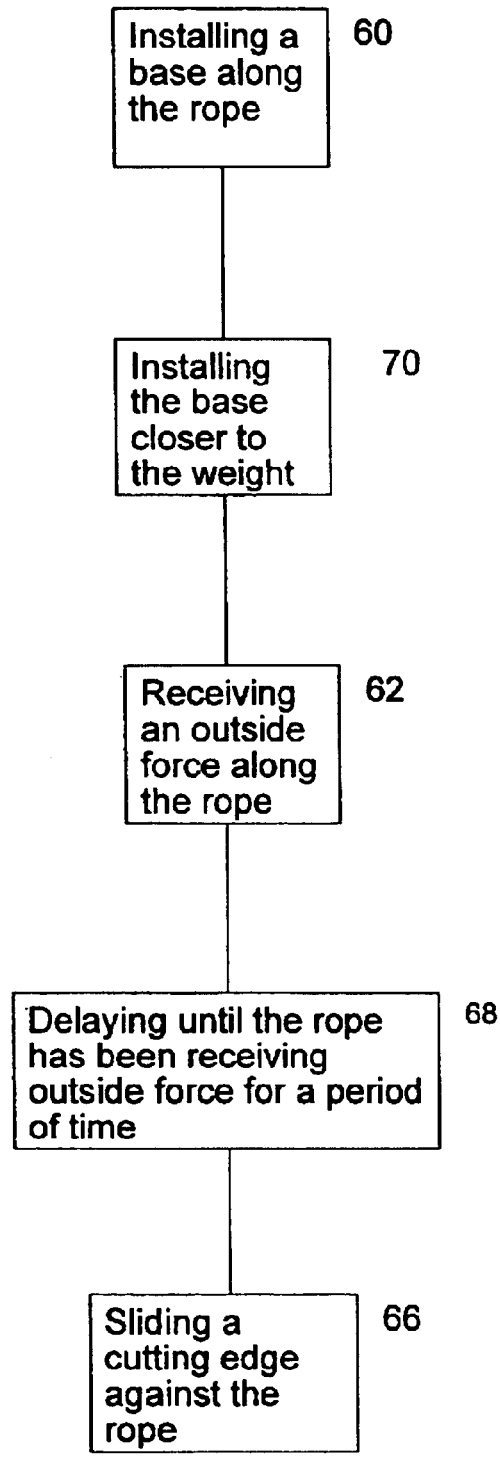
FIG. 7 is a flow diagram of another embodiment of the present invention.

The present invention is a rope severing apparatus 10 for releasing a rope 12 after continued tension. While the apparatus is herein described as severing and thereby releasing a rope 12, any tension-bearing member 12, such as wire or fishing line, can be used in place of the rope 12 without altering the spirit of the invention, if the tension-bearing member 12 is capable of supporting the necessary tension and can be severed. The first element of the rope severing apparatus 10 is the base 14, which has elastic properties that permit the base 14 to expand or compress when realizing tensional forces. The base 14 may include a spring 14a in one embodiment, although those skilled in the art would recognize there are other available elements with similar elastic properties that alternatively may be used. The base 14 is connected to a first connection point 16 wherein the first connection point 16 is formed to admit the rope 12. Preferably the first connection point 16 is a hole through which the rope 12 can be run and tied off. Alternatively, the first connection point 16 may secure to the rope 12 without the requirement of a knot. Finally, the present invention requires a cutting edge 18 connected to the base 14 and slidably oriented with the first connection point 16. The cutting edge 18 is arranged so that it will slide toward the first connection point 16 and sever the rope 12 when the apparatus 10 realizes a tensional force.

In one embodiment, the present invention will also include a second connection point 20 connected to the base 14, wherein the tensional force realized between the first and second connection points 16, 20 will cause the cutting edge 18 to slide in relation to the first connection point 16. Under this embodiment, it is clear that a tensional force realized between the first and second connection points 16, 20 could result in either a tensional or compressional force on the base 14, depending on how the apparatus is constructed. The first connection point 16 and the second connection point 20 can be rotatably-oriented to avoid having the rope become twisted.

In a narrower embodiment, the cutting edge 18 is connected to and inertially oriented with the second connection point 20. This construction means, as tensional force is realized between the first and second connection points 16, 20 and they slowly slide axially apart due to the elastic properties of the base 14, the cutting edge 18 will slide toward the first connection point 16 and cut into the rope 12 at the same rate the two connection points are sliding apart.

In one embodiment, the apparatus 10 includes a damper 22 attached to the base 14 wherein the damper 22 is dampening the elasticity of the base 14. The damper 22 can be designed to create a weight threshold before the apparatus 10 will cut the rope 12. The damper 22 can be designed to limit the speed with which the base 14 stretches or compresses in response to the tensional force. One type of damper 22 that may be used is an hydraulic damper 22a.

In one further embodiment, the hydraulic damper 22a has a first regulator 24. The first regulator 24 includes a first and a second cylindrical member 26, 28, slidably interconnected with a gap 30 formed between the first and second cylindrical members 26, 28. The gap 30 allows the flow 38 of hydraulic fluid 32 to pass through the gap 30 and anyone skilled in the art recognizes the use of the flow 38 of hydraulic fluid 32 to a hydraulic damper 22a. The flow 38 of hydraulic fluid 32 is controlled by a position of the first cylindrical member 26 in relation to the second cylindrical member 28.

The control of the flow 38 of hydraulic fluid 32 is based on physics principles. The further the first cylindrical 26 member encompasses the second cylindrical member 28, the longer the narrow gap 30 is along the first and second cylindrical member 26, 28. The longer the narrow gap 30 is, the greater the resistance applied to the flow 38 of the hydraulic fluid 32. The greater the resistance to the flow 38 of the hydraulic fluid 32, the less the hydraulic fluid 32 flows. This control of the flow 38 of hydraulic fluid 32 is designed to act counter to another force applied to the hydraulic fluid 32. Specifically, as tension is applied to the apparatus 10, the chamber 34 in which the hydraulic fluid 32 is stored will be pressured, forcing hydraulic fluid 32 to flow through the regulator 24. The greater the tension applied to the apparatus 10, the greater the pressure on the chamber 34 and the greater the flow 38 of hydraulic fluid 32. The present invention is designed to slideably adjust the first cylindrical member 26 in relation to the second cylindrical member 28 based on tension in the apparatus 10 to control the flow 38 of hydraulic fluid 32 and counter the effects of increasing pressure on the fluid chamber 34.

A further embodiment of the hydraulic damper 22a further involves a second regulator 36. Each of the regulators 24, 36 are designed to permit the flow 38 of hydraulic fluid 32 in only one direction. As shown in the figure, the first regulator 24 allows the flow 38 of hydraulic fluid 32 only when significant tension is applied to the apparatus 10 and the second regulator 36 allows the flow 38 of hydraulic fluid 32 only without significant tension applied to the apparatus 10. Based on this embodiment, the present invention controls the flow 38 of hydraulic fluid 32 in one direction when tension is applied to the apparatus 10 and controls the flow 38 of hydraulic fluid 32 in the other direction as the apparatus 10 resets, after being relieved of the tension. This design provides some drag on the reset. If an entangled whale were to struggle for a period of time insufficient to cut the rope 12 and rest before continuing the struggle, the present embodiment would not immediately reset and require the whale to begin the struggle wholly anew.

In the preferred embodiment the base 14 includes a control mechanism 40 that controls an effect of the force applied to the base 14 with regards to the elastic properties of the base 14. This control mechanism 40 may be an hydraulic dampening device. The result of the control mechanism 40 is that when the base 14 realizes a force, whether the force is 500 pounds or 10,000 pounds, the base 14 will react in the same precise manner. Ideally the manner of reaction is to slowly, precisely slide the cutting edge 18 toward the first connection point 16, allowing ten minutes or any other at least partially controlled measure of time to pass before the cutting edge 18 severs the rope 12. Again, the same amount of time would pass before the rope 12 was severed regardless of the weight.

The present invention also includes a method 50 of severing a rope 12 used in unattended fishing, wherein the rope 12 is held between a buoy 52, at a surface 54 of a body 56 of water, and a weight 58 below the surface 54 of the body 56 of water. The first step in the inventive method 50 is installing 60 a base 14 having elastic properties along the rope 12, between the buoy 52 and the weight 58 wherein the base 14 is connected to the rope 12 at a first connection point 16 on the base 14. The second step in severing the rope 12 is receiving 62 an outside force 64 applied to the rope 12, between the buoy 52 and the weight 58 thereby applying a force on the base 14. The intended source of the outside force 64 is a marine creature, such as a whale. The final step in the present method 50 of severing a rope 12 used in unattended fishing is sliding 66 a cutting edge 18 against the rope 12 at the first connection point 16, wherein the cutting edge 18 is connected to the base 14.

A narrower embodiment of the present inventive method 50 involves delaying 68 the step of sliding 66 the cutting edge 18 until after the rope 12 has been receiving the outside force 64 a minimum predetermined period of time. This delaying step 68 can be mechanically based on the base 14 using a spring 14a and hydraulic damper 22a or other means known to those skilled in the art.

Ideally, the present inventive method 50 involves installing 70 the base 14 closer to the weight 58 than to the buoy 52. The reason for this location is whales often get entangled closer to the bottom of the body 56 of water than the top and will be freed from entanglement more easily if the rope 12 is severed close to where they are entangled. Alternatively, the base 14 may be installed in the buoy 52.

Modifications and substitutions by one of ordinary skill in the art are considered to be within the scope of the present invention, which is not to be limited except by the following claims.

I claim:

1. A rope severing apparatus for releasing a tension-bearing member after continued tension, said apparatus comprising:
   a base having elastic properties;
   a first connection point connected to the base, wherein the first connection point is formed to admit the tension-bearing member; and
   a cutting edge connected to the base and slidably oriented with the first connection point thereby allowing the cutting edge to slide toward the first connection point for the purpose of severing the tension-bearing member when a force is applied to the base.

2. The rope severing apparatus of claim 1 further comprising a second connection point connected to the base, wherein a tensional force realized between the first and second connection points will cause the cutting edge to slide in relation to the first connection point.

3. The rope severing apparatus of claim 2 wherein the cutting edge is connected to and inertly-oriented with the second connection point.

4. The rope severing apparatus of claim 2 wherein the first connection point is rotationally-oriented to the second connection point.

5. The rope severing apparatus of claim 1 wherein the base comprises a spring.

6. The rope severing apparatus of claim 5 further comprising a damper attached to the base thereby dampening the elasticity of the base.

7. The rope severing apparatus of claim 6 wherein the damper comprises an hydraulic damper.

8. The rope severing apparatus of claim 7 wherein the hydraulic damper having a first regulator, the first regulator comprising a first and a second cylindrical member, slidably interconnected with a gap formed between the first and second cylindrical members wherein a flow of hydraulic fluid passes through the gap and the flow of hydraulic fluid is controlled by a position of the first cylindrical member in relation to the second cylindrical member.

9. The rope severing apparatus of claim 8 wherein the regulator maintains a constant flow of hydraulic fluid through the regulator when under tension.

10. The rope severing apparatus of claim 8 wherein the hydraulic damper further comprises a second regulator, wherein the first regulator allows the flow of hydraulic fluid only when significant tension is applied to the apparatus and the second regulator allows the flow of hydraulic fluid only without significant tension applied to the apparatus.

11. The rope severing apparatus of claim 5 wherein the base further comprises a control mechanism that controls an effect of the force applied to the base with regards to the elastic properties of the spring.

* * * * *